US008841604B2

(12) United States Patent
Denisov et al.

(10) Patent No.: US 8,841,604 B2
(45) Date of Patent: Sep. 23, 2014

(54) MASS ANALYSER

(75) Inventors: Eduard V. Denisov, Bremen (DE); Alexander Kholomeev, Bremen (DE); Jan-Peter Hauschild, Bremen (DE); Alexander A. Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 14/117,172

(22) PCT Filed: May 14, 2012

(86) PCT No.: PCT/EP2012/058941
§ 371 (c)(1), (2), (4) Date: Nov. 12, 2013

(87) PCT Pub. No.: WO2012/152950
PCT Pub. Date: Nov. 15, 2012

(65) Prior Publication Data
US 2014/0191122 A1 Jul. 10, 2014

(30) Foreign Application Priority Data
May 12, 2011 (GB) .................................. 1107959.7

(51) Int. Cl.
*H01J 49/00* (2006.01)
*H01J 49/26* (2006.01)
*B01D 59/44* (2006.01)

(52) U.S. Cl.
CPC ..................................... *H01J 49/26* (2013.01)
USPC ........... 250/281; 250/282; 250/283; 250/290; 250/292

(58) Field of Classification Search
CPC ..... H01J 49/282; H01J 49/0027; B82Y 30/00
USPC .................................. 250/282, 283, 290, 292
See application file for complete search history.

(56) References Cited

U.S. PATENT DOCUMENTS

| | | | | |
|---|---|---|---|---|
| 6,995,364 | B2 * | 2/2006 | Makarov et al. | 250/290 |
| 7,265,344 | B2 * | 9/2007 | Makarov et al. | 250/282 |
| 7,425,699 | B2 * | 9/2008 | Makarov et al. | 250/281 |

FOREIGN PATENT DOCUMENTS

| | | |
|---|---|---|
| GB | 2 402 260 A | 12/2004 |
| GB | 2 470 259 A | 11/2010 |

OTHER PUBLICATIONS

Alexander Makarov, "Electrostatic Axially Harmonic Orbital Trapping: A High-Performance Technique of Mass Analysis," Anal. Chem. 2000, 72, 1156-1162.

* cited by examiner

*Primary Examiner* — Nikita Wells
(74) *Attorney, Agent, or Firm* — Charles B. Katz

(57) ABSTRACT

A mass analyzer comprises: an electrical field generator, providing a time-varying electric field for injection of ions to be analyzed, excitation of ions to be analyzed or both; first and second detection electrodes, each of which receives a respective voltage pickup due to the time-varying electric field and provides a respective detection signal based on a respective image current at the detection electrode; and a differential amplifier, providing an output based on the difference between the detection signal for the first detection electrode and the detection signal for the second detection electrode. It may also be provided that the electrical field generator comprises at least one field generating electrode without a spatially symmetrical counterpart and the capacitance between each field generating electrode and the first detection electrode is substantially the same as the capacitance between that field generating electrode and the second detection electrode.

27 Claims, 4 Drawing Sheets

MASS ANALYSER

TECHNICAL FIELD OF THE INVENTION

The present invention relates to a mass analyser, a mass spectrometer comprising such a mass analyser, a method of mass analysis and a method of manufacturing a mass analyser.

BACKGROUND TO THE INVENTION

Fourier Transform Mass spectrometry (FTMS) can be used in Life Sciences for analysis of peptides, proteins and other heavy biological molecules. However, specific problems arise in FTMS in the analysis of heavy protein ions. These problems may also arise with other heavy biological molecule ions but protein ions will be referred to herein for illustration. Accordingly, the invention is not limited in application to analysis of proteins. A wide isotopic distribution of heavy protein ions results in a unique interference effect observed in FTMS. Initial constructive interference between the ion oscillations is quickly followed by destructive interference, when practically no signal is detected from those ions. This effect is discussed in Hofstadler et al, "Isotopic Beat Patterns in Fourier Transform Ion Cyclotron Resonance Mass Spectrometry: Implications for High Resolution Mass Measurements of Large Biopolymers", Int. J. Mass Spectrom. Ion Proc. 1994, 132, 109-127. and A. A. Makarov, E. Denisov. "Dynamics of ions of intact proteins in the Orbitrap mass analyzer", J. Am. Soc. Mass Spectrom. 2009, 20, 1486-1495.

As a result, the detected transient signal for such ions comprises a characteristic beat pattern, identifiable in the frequency domain. For heavier proteins, multiple beats are spaced further apart from one another in frequency. However, rapid signal decay in time is caused by collisions with residual gas and sometimes metastable fragmentation. In view of this, the second beat is frequently not observed for many heavier proteins of pharmaceutical importance (such as antibodies with molecular weight around 150 kDa).

In many cases, the first beat alone is sufficient to separate isotopic distributions corresponding to different modifications, such as glycosylation. However, the intensity of this beat in FTMS is at highest immediately after excitation of the ions. In other words, this is at the very first few milliseconds of the transient. It is difficult to obtain a transient signal suitable for detection of ions this quickly following excitation.

This difficulty is especially aggravated in orbital trapping Fourier Transform mass spectrometry, for example using an Orbitrap (trade mark) mass spectrometer where excitation is done by an injection process involving applying voltages on a deflector electrode and the central electrode of the trap. Subsequent settling time of voltages on the deflector electrode and the central electrode (providing a substantially electrostatic field during detection) could extend up to 20 ms. Reducing this settling time is desirable to address this issue. Similar problems exists in other forms of electrostatic traps.

SUMMARY OF THE INVENTION

Against this background, the present invention provides a mass analyser, comprising: an electrical field generator, configured to provide a time-varying electric field for injection of ions to be analysed, excitation of ions to be analysed or both; first and second detection electrodes, each of which is arranged such that it will receive a respective voltage pickup due to the time-varying electric field and so as to provide a respective detection signal based on a respective image current at the detection electrode; and a differential amplifier, arranged to provide an output based on the difference between the detection signal for the first detection electrode and the detection signal for the second detection electrode. The electrical field generator comprises at least one field generating electrode without a spatially symmetrical counterpart. Also, the electric field generator (especially one or more of the field generating electrodes) and the first and second detection electrodes are configured such that the capacitance between each field generating electrode and the first detection electrode is substantially the same as the capacitance between that field generating electrode and the second detection electrode. Preferably, the at least one field generating electrode is configured to receive a time-varying voltage in order to provide the time-varying electric field.

In this way, the voltage pickup on each of the two detection electrodes (from which a differential analyser output signal is obtained) is balanced between the two electrodes so that it does not drive the preamplifier outside of its operational range, especially in the time period quickly following excitation, injection or both, that is during the settling time of the voltage on the at least one field generating electrode. Since both detection electrodes have substantially identical voltage pickup due to the time-varying electric field, the voltage pickup is not seen at the output of the differential amplifier. Moreover, the time taken for the voltage pickup at the detection electrodes to be substantially the same is much smaller than the taken for the time dependent voltage or voltages on the deflection electrode, electric field generating electrode or both to settle. In this respect, the time delay between the signals from the detection electrodes should be small in comparison with the time constant of the field change for the time-varying electric field. It should be noted that the term "electrostatic" in "electrostatic traps" defines that the field is substantially electrostatic during the detection process only, though it still could be varying during other stages of analysis, for example injection into the trap, quenching ions, etc.

Advantageously, the electric field generator and the first and second detection electrodes are configured such that the amplitude of the output from the differential amplifier is within an allowed range at (that is, at and after) a transition time. The allowed range is desirably such that the output from the differential amplifier can be used to detect image currents from ions oscillating within the mass analyser. Optionally, the allowed range is such that the voltage pickup at the first detection electrode is substantially the same as the voltage pickup at the second detection electrode. An initialisation time period is defined between the time at which the field generating electrode begins to provide the time-varying electric field or electrostatic field and the transition time. The image current detected due to ion oscillation at the detection electrodes may not be derivable from the detection signal for the first detection electrode and the detection signal for the second detection electrode for some or all of this initialisation time period. Beneficially, the transition time is the earliest time that the amplitude of the output from the differential amplifier is within the allowed range.

Preferably, the electrical field generator and the first detection electrode are configured such that, during at least the initialisation time period, the voltage pickup on the first detection electrode is of sufficient magnitude such that the detection signal for the first detection electrode would saturate the differential amplifier if the detection signal for the second detection electrode were zero. More preferably, this remains the case subsequent to the initialisation time period. Detection may also beneficially begin while this remains the case.

In the preferred embodiment, the initialisation time period has a duration that is no longer than a number of periods of oscillation for a typical protein ion of interest (that is, a protein ion to be analysed in the analyser). The typical protein ion of interest may be a protein ion with a molecular weight of at least 1000 Da, 2000 Da, 3000 Da, 4000 Da, 5000 Da or 6000 Da. Optionally, the number of periods of oscillation is 200, 500 or 1000. In the preferred embodiment, the initialisation time period has a duration of no more than 1 ms, although optionally a duration of no more than 2 ms, 3 ms, 4 ms or 5 ms. This is much less than the 6 ms to 7 ms period of an existing Orbitrap mass analyser.

Preferably, the field generating electrode is configured to generate an electric field which causes ions to oscillate at a frequency that changes with time due to the time-varying applied voltage. Here, the field generating electrode may be further configured such that the rate of change of ion oscillation frequency with time is at a relatively high value at the start of the initialisation time period and at a relatively low value at the end of the initialisation time period.

Beneficially, the mass analyser is configured to perform ion detection during a detection time period, the detection time period starting at the transition time and having a duration, T. Optionally, the rate of change in ion oscillation frequency during the detection time period integrated over T is no greater than 1/T.

In some embodiments, the application of a time-varying voltage to the field generating electrode may cause mechanical oscillations in at least one of: the field generating electrode; the first detection electrode; and the second detection electrode. Advantageously, damping of the mechanical oscillations may be provided. Then, the mass analyzer is preferably configured such that the time constant of damping for the mechanical oscillations is not significantly greater than the duration of the initialisation time period. This assists in maintaining the balance between the voltage pickup at the first detection electrode and the voltage pickup at the second detection electrode, by limiting the amount of mechanical movement which affects the capacitances. The time constant of damping being not significantly greater than the duration of the initialisation time period may be indicated when the time constant is less than, equal to or not detectably greater than the initialisation time period duration. For example, the signal detected at one of the plurality of detection electrodes directly may show this, when the detected transient signal is modulated with an exponentially decaying waveform that disappears when voltage on the field generating electrode is made zero.

Additionally or alternatively, the mass analyser forms part of a mass spectrometer comprising a vacuum pump and the mass analyzer is preferably configured such that the resonant frequency of at least one of: the field generating electrode; the first detection electrode; and the second detection electrode is different from the frequency of the vacuum pump. Preferably, the difference in frequency is at least 5%, 10% or 20%.

Advantageously, the mass analyser further comprises vibration dampers, arranged to define the time constant of damping for the mechanical oscillations. The vibration dampers may include modifications or additions to at least one of: the field generating electrode; the first detection electrode; and the second detection electrode. Additionally or alternatively, at least one of: the field generating electrode; the first detection electrode; and the second detection electrode is made from a metal having a hardness, said hardness defining the time constant of damping for the mechanical oscillations. The geometry of the electrode may also define the time constant of damping for the mechanical oscillations. By using a soft metal, the vibrations are damped. Preferably, the metal is aluminium.

In the preferred embodiment, the at least one field generating electrode comprises an electric field generating electrode being configured to generate an electrostatic field causing ion packets to oscillate within the analyser. Advantageously, the ion packets oscillate along an axis. More preferably, the electric field generating electrode is an inner electrode arranged along an axis. Then, the first and second detection electrodes may be outer electrodes, positioned along the axis concentric with the inner electrode to enclose the inner electrode and to define a space between the inner electrode and outer electrodes. This space defines an ion trapping volume for the ion packets to oscillate therein. This is a typical structure of an Orbitrap mass analyser. Beneficially, the first and second detection electrodes are arranged symmetrically with respect to the inner electrode, such that the capacitance between the inner electrode and the first detection electrode is substantially the same as the capacitance between the inner electrode and the second detection electrode. By maintaining this symmetry, the voltage pickup at the two detection electrodes may be balanced.

Additionally or alternatively, the at least one field generating electrode may comprise a deflector electrode, arranged to provide an injection field for ions to be analysed. Then, the field generating electrode may be shaped such that the capacitance between the deflector electrode and the first detection electrode is substantially the same as the capacitance between the deflector and the second detection electrode. Beneficially, the deflector electrode is shaped such that the capacitance between the deflector electrode and the first detection electrode is substantially the same as the capacitance between the electric field generating electrode and the first detection electrode.

Another aspect of the present invention may be found in a mass analyser, comprising: an electrical field generator, comprising a field generating electrode configured to provide a time-varying electric field for injection of ions to be analysed, excitation of ions to be analysed or both; first and second detection electrodes, each of which is arranged such that it will receive a respective voltage pickup due to the time-varying electric field and so as to provide a respective detection signal based on a respective image current at the detection electrode; and a differential amplifier, arranged to provide an output based on the difference between the detection signal for the first detection electrode and the detection signal for the second detection electrode. The electric field generator and the first and second detection electrodes are configured such that the amplitude of the output from the differential amplifier is within an allowed range at a transition time, the allowed range being such that the output from the differential amplifier can be used to detect image currents from ions injected to the mass analyser and wherein an initialisation time period is defined between the time at which the field generating electrode begins to provide the time-varying electric field and the transition time. Moreover, the application of a time-varying voltage to the field generating electrode causes mechanical oscillations in at least one of: the field generating electrode; the first detection electrode; and the second detection electrode, and wherein the mass analyzer is configured such that the time constant of damping for the mechanical oscillations is not significantly greater than the duration of the initialisation time period.

This can alternatively be expressed as a mass analyser, comprising: an electrical field generator, comprising a field generating electrode configured to provide a time-varying electric field for injection of ions to be analysed, excitation of ions to be analysed or both; first and second detection electrodes, each of which is arranged such that it will receive a respective voltage pickup due to the time-varying electric field and so as to provide a respective detection signal based on a respective image current at the detection electrode; and a differential amplifier, arranged to provide an output based on the difference between the detection signal for the first detection electrode and the detection signal for the second detection electrode. The mass analyser is configured (preferably, mechanically) such that the application of a time-varying voltage to the field generating electrode causes substantially (that is, detectably) no excitation in the field generating electrode, the first detection electrode and the second detection electrode.

Optionally, the electric field generator and the first and second detection electrodes are configured such that the capacitance between each field generating electrode and the first detection electrode is substantially the same as the capacitance between that field generating electrode and the second detection electrode.

In some embodiments, the mass analyser further comprises vibration dampers, arranged to define the time constant of damping for the mechanical oscillations. Additionally or alternatively, at least one of: the field generating electrode; the first detection electrode; and the second detection electrode is made from a metal having a hardness, said hardness defining the time constant of damping for the mechanical oscillations.

In a further aspect of the present invention, there is provided a mass spectrometer comprising the mass analyser as described herein.

Another aspect of the present invention provides a method of mass analysis, comprising: providing a time-varying voltage to an electrical field generator comprising at least one field generating electrode, so as to provide a time-varying electric field for injection of ions to be analysed, excitation of ions to be analysed or both; receiving at first and second detection electrodes, a respective voltage pickup due to the injection field or electrostatic field; providing from each of the first and second detection electrodes a respective detection signal, based on a respective image current at the detection electrode; and generating a differential amplifier output, based on the difference between the detection signal for the first detection electrode and the detection signal for the second detection electrode. The electrical field generator comprises at least one field generating electrode without a spatially symmetrical counterpart. Also, the voltage pickup received at the first detection electrode is substantially the same as the voltage pickup received at the second detection electrode.

Advantageously, the electric field generator and the first and second detection electrodes are configured such that the capacitance between each field generating electrode and the first detection electrode is substantially the same as the capacitance between that field generating electrode and the second detection electrode.

Optionally, the amplitude of the output from the differential amplifier is within an allowed range at a transition time, the allowed range being such that the output from the differential amplifier can be used to detect image currents from ions injected to the mass analyser. Optionally, wherein an initialisation time period is defined between the time at which the step of providing a time-varying voltage to the field generating electrode begins and the transition time.

Preferably, during at least the initialisation time period, the voltage pickup on the first detection electrode is of sufficient magnitude such that the detection signal for the first detection electrode would saturate the differential amplifier if the detection signal for the second detection electrode were zero. More preferably, the initialisation time period has a duration of no more than 1 ms.

In some embodiments, the step of providing a time-varying voltage to field generating electrode comprises generating an electric field which causes ions to oscillate at a frequency that changes with time, the rate of change of ion oscillation frequency with time being set at a relatively high value at the start of the initialisation time period and at a relatively low value at the end of the initialisation time period. Optionally, the method further comprises detecting ions during a detection time period, the detection time period starting at the transition time and having a duration, T. Then, the rate of change in ion oscillation frequency integrated over T may be no greater than 1/T.

It may be appreciated that the method may further comprise features corresponding to those of the mass analyser described above and herein. Where applicable, aspects of the present invention may be embodied in a computer program configured to carry out the method described herein when operated on a processor and optionally in a computer readable medium comprising such a computer program.

In a yet further aspect of the present invention, there is provided a method of manufacturing a mass analyser, comprising: providing an electrical field generator, comprising at least one field generating electrode configured to receive a time-varying voltage in order to provide a time-varying electric field for injection of ions to be analysed, excitation of ions to be analysed or both, the electrical field generator comprising at least one field generating electrode without a spatially symmetrical counterpart; arranging first and second detection electrodes such that each will receive a respective voltage pickup due to the time-varying electric field and such that each provides a respective detection signal based on a respective image current at the detection electrode; arranging a differential amplifier to provide an output based on the difference between the detection signal for the first detection electrode and the detection signal for the second detection electrode; and configuring the electric field generator and the first and second detection electrodes such that the capacitance between each field generating electrode and the first detection electrode is substantially the same as the capacitance between that field generating electrode and the second detection electrode.

A further method of manufacturing a mass analyser may be provided. This method comprises: providing an electrical field generator, comprising at least one field generating electrode configured to receive a time-varying voltage in order to provide a time-varying electric field for injection of ions to be analysed, excitation of ions to be analysed or both; arranging first and second detection electrodes such that each will receive a respective voltage pickup due to the time-varying electric field and such that each provides a respective detection signal based on a respective image current at the detection electrode; arranging a differential amplifier to provide an output based on the difference between the detection signal for the first detection electrode and the detection signal for the second detection electrode; and configuring the electric field generator and the first and second detection electrodes such that the amplitude of the output from the differential amplifier is within an allowed range at a transition time, the allowed range being such that the output from the differential amplifier can be used to detect image currents from ions injected to the mass analyser, an initialisation time period being defined between the time at which the field generating electrode begins to provide the time-varying electric field and the transition time. The application of a time-varying voltage to the field generating electrode causes mechanical oscillations in at least one of: the field generating electrode; the first detection electrode; and the second detection electrode. The method further comprises adjusting the mass analyser such that the time constant of damping for the mechanical oscillations is not significantly greater than the duration of the initialisation time period. This method optionally comprises application of the mass analyser configurations described herein in order to achieve the time constant of damping for the mechanical oscillations.

It will be understood that these methods may additionally comprise manufacturing steps relating to the corresponding features of the mass analyser described above and herein.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 1:
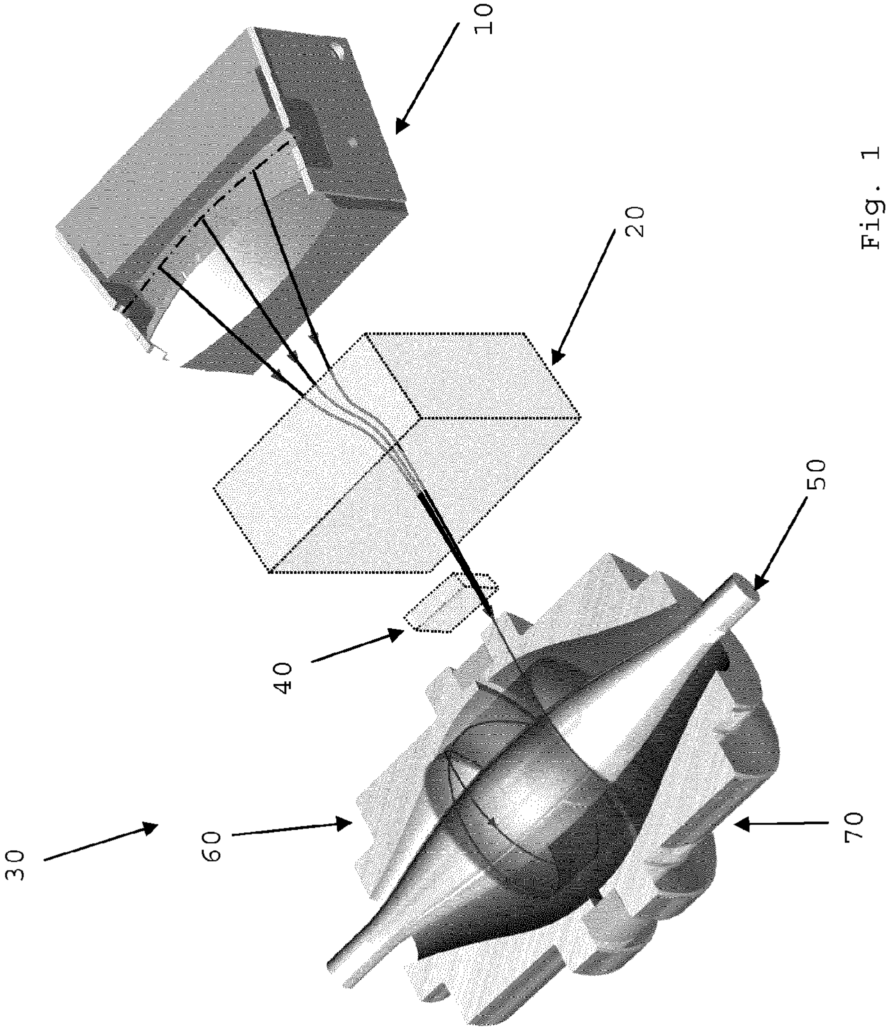
FIG. 1 shows schematically a part of an existing mass spectrometer comprising a mass analyser.

Referring first to FIG. 1, there is shown schematically a part of an existing mass spectrometer. The part of the mass spectrometer comprises: an ion storage device 10; ion optics 20; and a mass analyser 30. The mass analyser 30 is of Orbitrap-type and comprises: a deflector 40; a central electrode 50; a first outer electrode 60; and a second outer electrode 70 (the outer electrodes 60, 70 radially enclose the central electrode 50 and are shown cut-away in the Figure to reveal the central electrode for illustration). The general operation of such a mass analyser is well known, but further details may be found in WO-A-02/078046, WO-A-2006/129109 and WO-A-2007/000587, the contents of which are incorporated by reference herein.

Ion injection into the mass analyser 30 is implemented by the following steps. Firstly, ions coming from an external ion source are stored in the ion storage device 10 (preferably a curved trap, C-trap, for example as described in U.S. Pat. No. 7,498,571, U.S. Pat. No. 7,425,699 and WO-A-2008/081334). Then, the stored ions are pulsed towards the mass analyser 30 via ion optics 20. Ions enter the mass analyser 30 from outside, offset from equator, through an injection slot, while the time varying voltage on the central electrode 50 is ramped upwards to provide an increasing electric field. Accurate adjustment of the entrance parameters is performed by the deflector 40 located above the injection slot. Ions start axial oscillations of the central electrode 50 at slowly decreasing amplitude and radius as ramping of the voltage on the central electrode 50 continues. At the same time, the voltage is ramped on the deflector 40 to the level corresponding to minimum perturbation of field inside the analyser. Finally, ramping of the voltages stops and the ions are ready for detection using image currents induced in the split outer electrodes (the first outer electrode 60 and the second outer electrode 70). The signals detected at the first outer electrode 60 and the second outer electrode 70 are passed to a differential amplifier (not shown) in a pre-amplifier. The differential amplifier outputs a signal based on the difference between the signals detected at the first outer electrode 60 and the second outer electrode 70. This output is used to provide a mass spectrum through Fourier analysis.

In practice, the ramping of the voltage applied to the central electrode 50 and the deflector 40 is performed with rates of up to 10-40 V/microsecond. This results in large capacitive voltage pickup on the first outer electrode 60 and a second outer electrode 70 acting as detection electrodes. The displacement currents can reach milliamperes and the transition processes can last as long as 20 ms. Using higher buffer capacitances, fast regulating power supplies and other known measures in the field of high voltage electronics, it is possible to reduce this time to a few milliseconds. It will now be shown that this is insufficient to meet the requirements for mass analysis of heavy protein ions.

As discussed above, a unique interference effect is observed in the FTMS analysis of such ions with a wide isotopic distribution. "Isotopic Beat Patterns in Fourier Transform Ion Cyclotron Resonance Mass Spectrometry: Implications for High Resolution Mass Measurements of Large Biopolymers" (referenced above) provides the basis for the following analysis relating to this effect.

The first beat starts from its maximum value and decays with time constant $$\Delta t_w = 1/(2\Delta f_w),$$

where $\Delta f_w$ is spread of frequencies corresponding to width of isotopic distribution $\Delta M_w$ of a of interest of molecular mass M. In electrostatic traps (such as Orbitrap-type mass analysers, but also including Fourier Transform Ion Cyclotron Resonance, FTICR, mass analysers), $$\Delta f_w / f = \Delta M_w / (2M),$$

where f is the frequency of oscillations for a particular charge state Z of protein (i.e. at mass M/Z). Therefore $$\Delta t_w = 1/f^* M/\Delta M_w.$$

$M/\Delta M_w$ depends on the mass of the protein, purity of protein and its isotopic composition. For natural distribution of carbon isotopes, $M/\Delta M_w$ typically lies in the range 4000-6000 for proteins with M>80,000 Da. However, in reality $M/\Delta M_w$ may be lower due to numerous posttranslational modifications and adducts. For example, 2000-3000 was observed in P. V. Bondarenko, T. P. Second, V. Zabrouskov, Z. Zhang, A. A. Makarov, "Mass Measurement and Top-Down HPLC/MS Analysis of Intact Monoclonal Antibodies on a Hybrid Linear Quadrupole Ion Trap—Orbitrap Mass Spectrometer", J. Am. Soc. Mass Spectrom. 2009, 20, 1415-1424.

Therefore detection of such proteins in electrostatic traps should start at a moment $t_d$ significantly earlier than the signal decays, i.e. $t_d < \Delta t_w$ or, still better, $t_d << \Delta t_w$. Therefore detection should start just after several hundred oscillations of protein ions of interest, e.g. 100 to 1000. With M/Z lying in the range 1000 to 4000, frequencies of ion oscillation may cover the range from 200 to 400 kHz in a practical Orbitrap mass analyser. Thus, the desired start of detection should occur within (preferably less than) 1 ms after ion injection.

However, the requirement to start detection within 1 ms desirably demands linear operation of the differential amplifier with a typical 1 nV/√Hz noise band already at that time. This imposes further restrictions on the design of the mass analyser 30.

A solution to these difficulties can be achieved if both channels of the differential amplifier are provided with identical time-dependant voltage waveforms superimposed with the image current signal. The identical time-dependant voltage waveforms are cancelled out at the differential amplifier. Prior to such detection, it is desirable that these voltage waveforms be damped to levels allowing linear operation of the differential amplifier. However, it is allowed for each the voltage on each channel to saturate the differential amplifier if were applied alone.

This may be implemented by ramping the voltages with an exponentially decaying rate. The high-voltage power supply is connected to the central electrode by a transistor switch. Prior to the vacuum feedthrough, a resistor R is installed which, together with capacitance C of the electrode, forms an RC chain. As current to the electrode is limited by the resistance, the voltage rises as (1−exp(−t/RC)) causing the exponentially decreasing rate. Typically, RC is about 30 to 50 μs. Fine tuning of this increase might be achieved by limiting the current into the transistor switch. The RC chain may also act as a filter against external electronic noise. Also, high-speed limiting diodes are installed at the input of both channels of the differential amplifier. Preferably, the time constant of such damping is less than 100 microseconds and more preferably less than 50 microseconds.

It can be shown that if detection starts at time $t_d$ when remaining the voltage difference between the central and outer electrodes is $V(t_d)$, then the relative additional peak broadening is $$\delta_m \approx (\tau/T)^* V(t_d)/U_r$$

where T is the duration of detection, T is the time constant of exponential decay and $U_r$ is the equilibrium voltage between the central and outer electrodes during detection. This will not visibly affect peak shape if this mass shift stays well within one frequency bin, which is 1/T. To achieve this, the following requirement may be imposed.

$$V(t_d)/U_r < 2/(f\tau)$$

This becomes an increasingly more strict requirement for ions of small m/z, possessing highest frequencies f. Practically for m/z=50, the frequency does not exceed 2 MHz and $V(t_d)/U_r < 1\%$. However, the preamplifier will start linear detection only at $V(t_d)/U_r < 0.1\%$. Hence, this effect does not typically affect measured frequencies. It is rather the time constant of the residual regulation of power supplies (usually in hundreds of microseconds) that might continue to affect measured frequencies. In practice, this can be calibrated by precise measurement of residual voltage waveforms on the electrodes.

Figure 2:
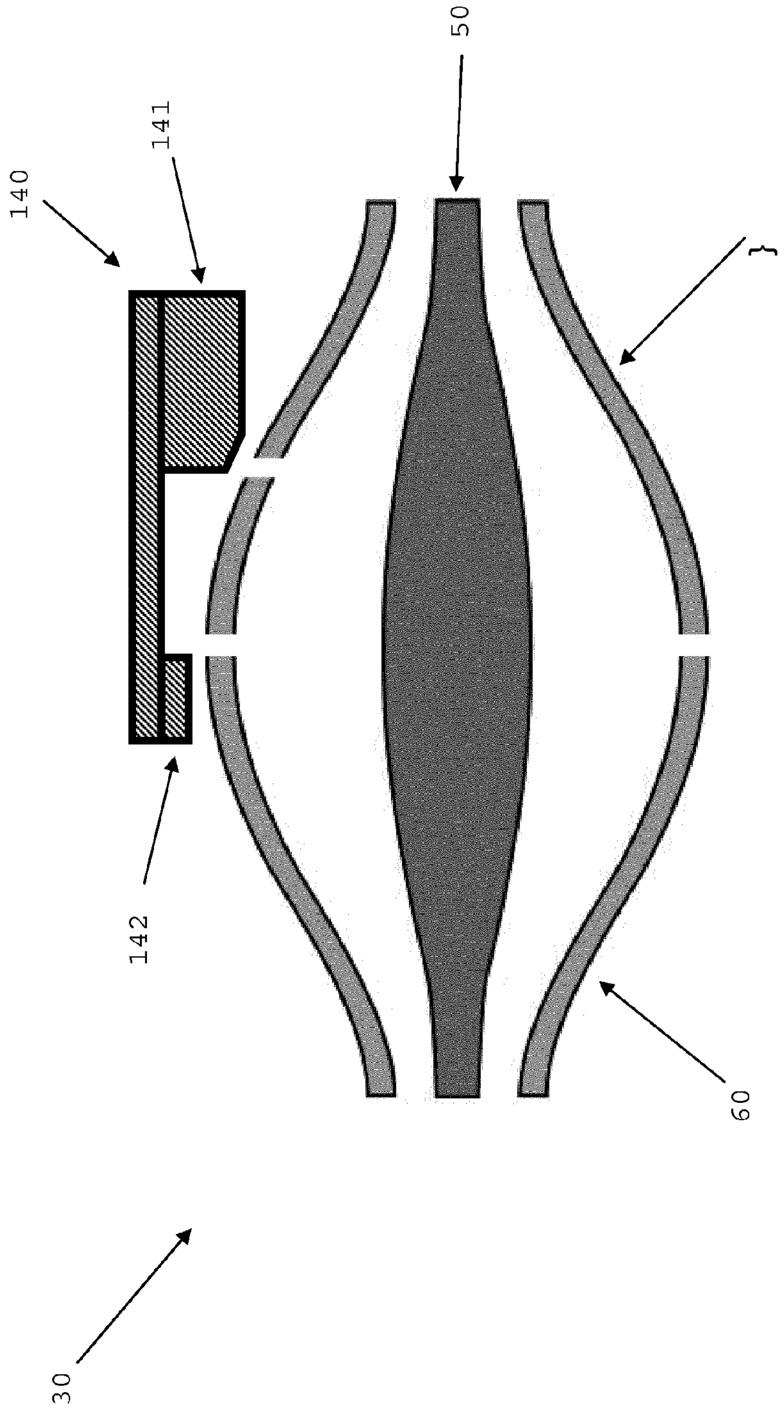
FIG. 2 shows a schematic of the mass analyser in line with FIG. 1, including adaptations in accordance with the present invention.

Identical waveforms are achieved by making the coupling capacitances to each electrode providing a time-dependant voltage identical for both detection electrodes. Referring next to FIG. 2, there is shown a schematic of the mass analyser in line with FIG. 1, including adaptations. Where the same features are shown as in FIG. 1, the same reference numerals have been used. FIG. 2 shows an adapted deflector 140, replacing the deflector 40 shown in FIG. 1.

The adaptations shown in FIG. 2 allow the capacitance between the central electrode 50 and the first outer electrode 60 to be balanced with the capacitance between the central electrode 50 and the second outer electrode 70. Also, the capacitance between the deflector 140 and the first outer electrode 60 is balanced with the capacitance between the deflector 140 and the second outer electrode 70.

For the central electrode 50, this is achieved by making both the first outer electrode 60 and the second outer electrode 70 geometrically symmetrical and feeding the central electrode 50 by a wire along the axis so that any capacitance imbalance is minimised. For the deflector 140, this is preferably achieved by adding first additional metal part 141 and second additional metal part 142 to adjust the capacitance between the deflector 140 and each of the detection electrodes 60 and 70 equal and equal to the capacitance to the central injection electrode 50. This is an improvement in comparison with installing wire-mounted or surface-mounted capacitances at the pre-amplifier, due to absence of any phase shift and the high stability of the resulting values due to dimensional stability.

However, it is desirable to make sure that the resonant frequency of the balancing metal parts 141 and 142 and other parts of the trap lies outside of the range of major resonance frequencies present in the mass spectrometer. These especially include multiples of the rotary pump and turbo pump frequencies. Also, voltage switching results in mechanical oscillations of all electrodes which should be damped to levels inconsequential for detection. Increase of both resonance frequency and damping may achieved by a variety of methods, such as: increasing thickness of the balancing metal parts 141 and 142; using soft metals (such as aluminium); and tighter fixing of parts together (welding, soldering, screwing on are preferable). Preferably, the time constant of mechanical damping is less than 500 microseconds or 1000 microseconds.

To achieve this, the mechanical design of the electrode is chosen either not to be substantially excited by a time-varying electric field (to the extent that excitation cannot normally be detected) or damped with a time constant comparable with $t_d$. Nevertheless, if the oscillation effect is small, then damping does not need to be faster than $t_d$.

Moreover, adjusting the resonant frequencies is achieved by hanging the mass analyser assembly on a thin metal membrane. Sudden changes of cross-section at the membrane restrict propagation of sound waves and also allow tuning resonance frequencies away from those of pumps and other devices. Sandwiches of materials can also be used to improve this, for example Stainless Steel on Aluminium or ceramic on Stainless Steel. Ensuring that these materials are tightly assembled, for example, so that there is no rattling at low frequencies, further reduces the effect of vibrations.

In addition, it was found that vibrations could be initiated purely by electrostatic interaction of a charging electrode with a grounded chamber. This may be mitigated by ensuring appropriate separation between the electrodes and ground, or by making any interaction symmetrical.

By using this approach, the signal received at the detection electrodes directly (that is, without differential preamplifier) shows that the transient on one of electrodes is modulated with an exponentially decaying waveform which disappears when the voltage on the deflector (or central electrode or both) is adjusted to zero.

Figure 3:
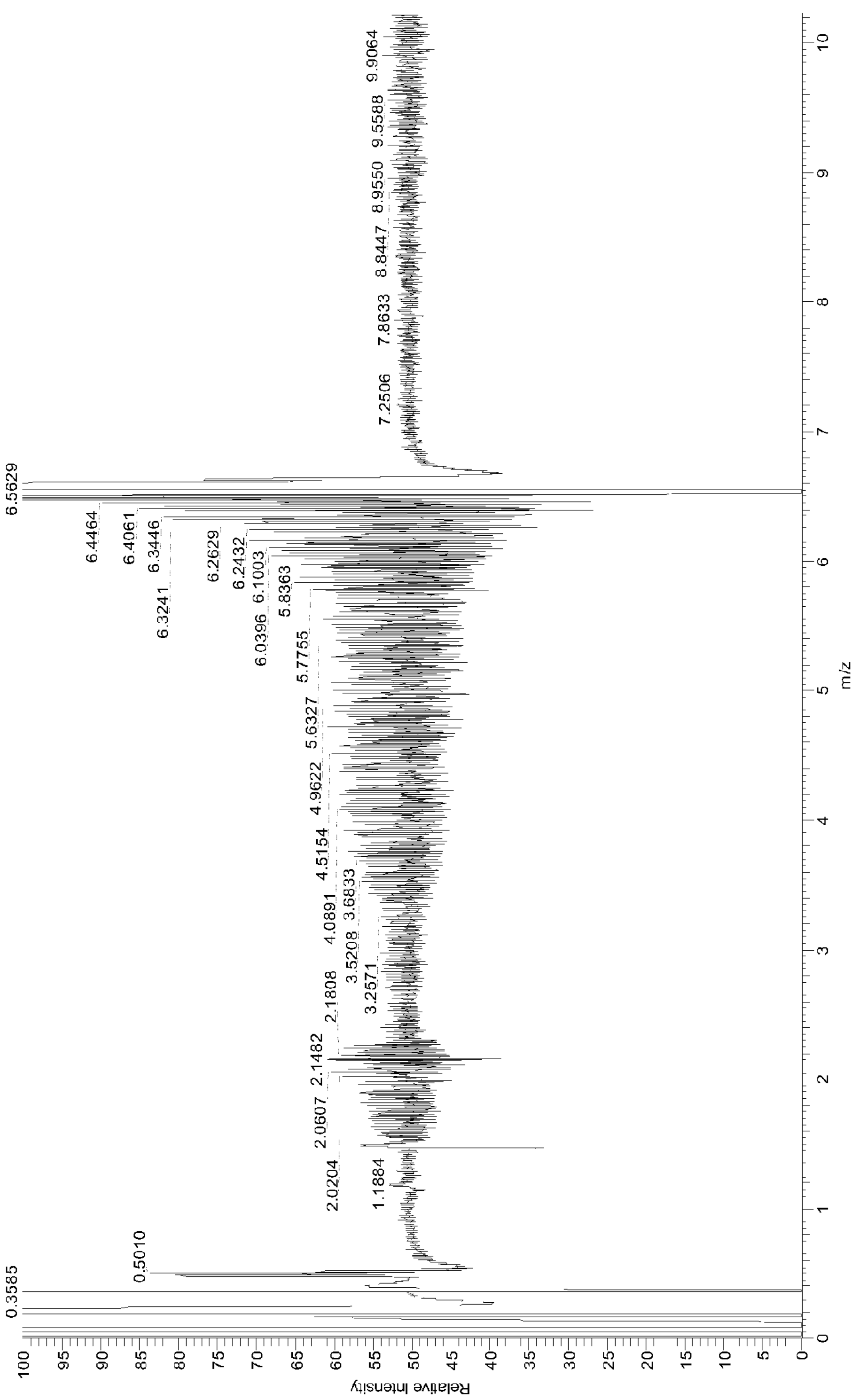
FIG. 3 shows an example of a time-domain signal generated using an existing mass analyser.

The improvement made by the present invention can be seen in the time-domain output signal from the differential amplifier. In FIG. 3, there is shown a time-domain signal generated using an existing mass analyser. No image current signal is visible before 7 ms and strong ringing occurs until the actual image current signal is observed after 8 to 9 ms.

Figure 4:
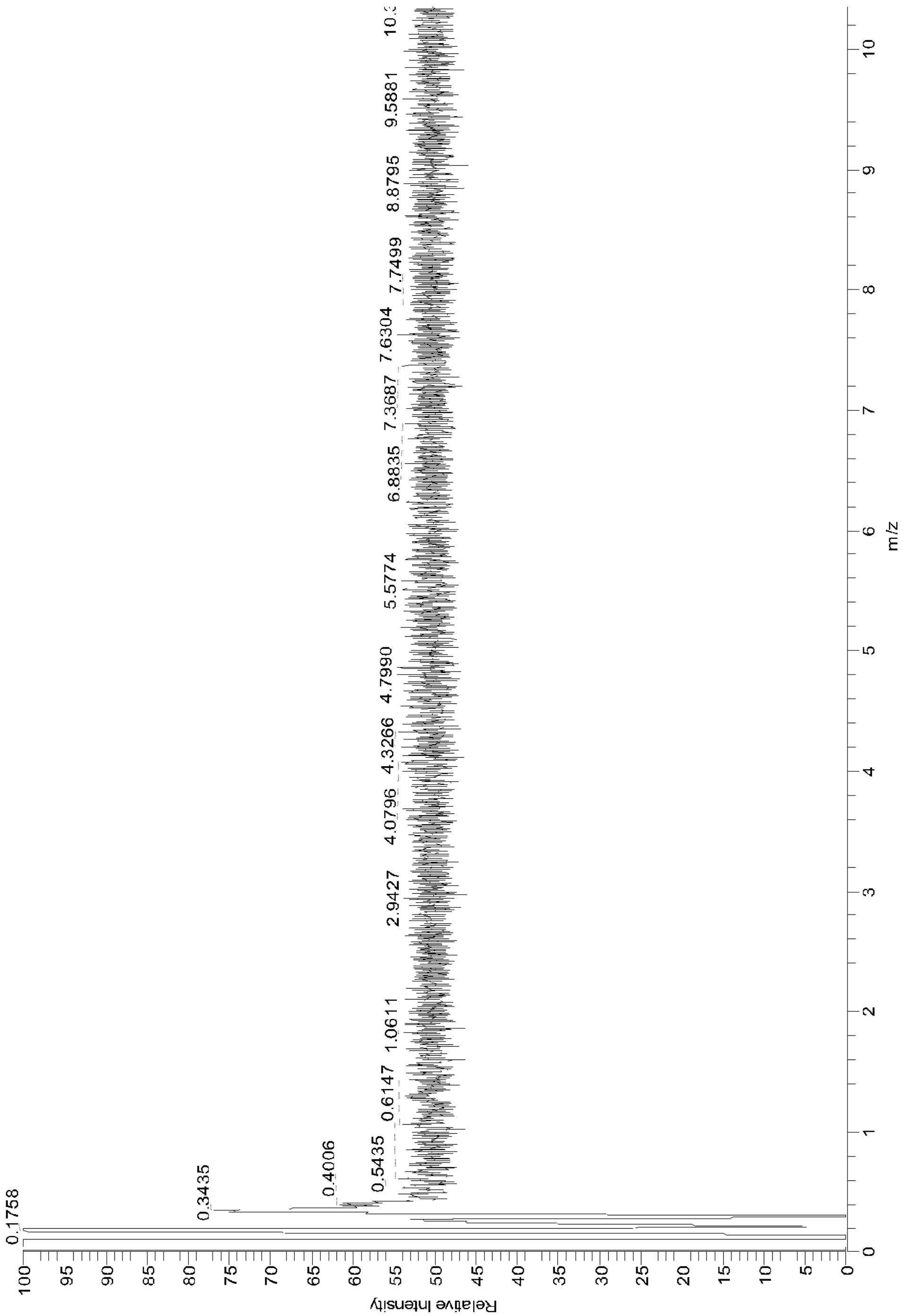
FIG. 4 shows an example of a time-domain signal generated using a mass analyser in accordance with the present invention.

In contrast, FIG. 4 shows an example of a time-domain signal generated using a mass analyser in accordance with the present invention. Here, the image current signal is observable starting from about 0.5 ms.

Slow stabilization of the central electrode voltage, due to regulation of the power supply, manifests itself as asymmetric peaks in the frequency spectrum, usually with a tail on the high mass (that is, low frequency) side. Saturation of the preamplifier within first 0.5 ms is not typically visible on a frequency spectrum.

Whilst specific embodiments have been described herein, the skilled person may contemplate various modifications and substitutions.

For example, it will be understood that the invention could be applied to all types of electrostatic traps with time-dependant voltages. It is also applicable to time-of-flight and FTICR mass analysers. It may also be beneficial for implementation of signal processing methods that are described in European Patent Application No. 10158704.6 filed on 31 Mar. 2010.

Whilst two detection electrodes have been used in the preferred embodiment, the skilled person will appreciate that any greater number of electrodes may be used. In particular, an even number of detection electrodes may be used, such that differential signals may be obtained.

The invention claimed is:

1. A mass analyser, comprising:

an electrical field generator, configured to provide a time-varying electric field for injection of ions to be analysed, excitation of ions to be analysed or both;

first and second detection electrodes, each of which is arranged such that it will receive a respective voltage pickup due to the time-varying electric field and so as to provide a respective detection signal based on a respective image current at the detection electrode; and a differential amplifier, arranged to provide an output based on the difference between the detection signal for the first detection electrode and the detection signal for the second detection electrode;

wherein the electrical field generator comprises at least one field generating electrode without a spatially symmetrical counterpart; and wherein the electric field generator and the first and second detection electrodes are configured such that the capacitance between each field generating electrode and the first detection electrode is substantially the same as the capacitance between that field generating electrode and the second detection electrode.

2. The mass analyser of claim 1, wherein the electric field generator and the first and second detection electrodes are configured such that the amplitude of the output from the differential amplifier is within an allowed range at a transition time, the allowed range being such that the output from the differential amplifier can be used to detect image currents from ions injected to the mass analyser and wherein an initialisation time period is defined between the time at which the field generating electrode begins to provide the time-varying electric field and the transition time.

3. The mass analyser of claim 2, wherein the electrical field generator and the first detection electrode are configured such that, during at least the initialisation time period, the voltage pickup on the first detection electrode is of sufficient magnitude such that the detection signal for the first detection electrode would saturate the differential amplifier if the detection signal for the second detection electrode were zero.

4. The mass analyser of claim 2, wherein the initialisation time period has a duration of no more than 1 ms.

5. The mass analyser of claim 2, wherein the field generating electrode is configured to generate an electric field which causes ions to oscillate at a frequency that changes with time, the field generating electrode being further configured such that the rate of change of ion oscillation frequency with time is at a relatively high value at the start of the initialisation time period and at a relatively low value at the end of the initialisation time period.

6. The mass analyser of claim 5, wherein the mass analyser is configured to perform ion detection during a detection time period, the detection time period starting at the transition time and having a duration, T, and wherein the rate of change in ion oscillation frequency during the detection time period integrated over T is no greater than 1/T.

7. The mass analyser of claim 2, wherein the application of a time-varying voltage to the field generating electrode causes mechanical oscillations in at least one of: the field generating electrode; the first detection electrode; and the second detection electrode, and wherein the mass analyzer is configured such that the time constant of damping for the mechanical oscillations is not significantly greater than the duration of the initialisation time period.

8. The mass analyser of claim 7, further comprising:

vibration dampers, arranged to define the time constant of damping for the mechanical oscillations.

9. The mass analyser of claim 7, wherein at least one of: the field generating electrode; the first detection electrode; and the second detection electrode is made from a metal having a hardness, said hardness defining the time constant of damping for the mechanical oscillations.

10. The mass analyser of claim 1, wherein the at least one field generating electrode comprises an electric field generating electrode being configured to generate an electrostatic field causing ion packets to oscillate within the analyser.

11. The mass analyser of claim 10, wherein the electric field generating electrode is an inner electrode arranged along an axis, the first and second detection electrodes being outer electrodes, positioned along the axis concentric with the inner electrode to enclose the inner electrode and to define a space between the inner electrode and outer electrodes, said space defining an ion trapping volume for the ion packets to oscillate therein.

12. The mass analyser of claim 11, wherein the first and second detection electrodes are arranged symmetrically with respect to the inner electrode, such that the capacitance between the inner electrode and the first detection electrode is substantially the same as the capacitance between the inner electrode and the second detection electrode.

13. The mass analyser of claim 10, wherein the at least one field generating electrode comprises a deflector electrode, arranged to provide an injection field for ions to be analysed and wherein the deflector electrode is shaped such that the capacitance between the deflector electrode and the first detection electrode is substantially the same as the capacitance between the deflector and the second detection electrode.

14. The mass analyser of claim 13, wherein the deflector electrode is shaped such that the capacitance between the deflector electrode and the first detection electrode is substantially the same as the capacitance between the electric field generating electrode and the first detection electrode.

15. A mass analyser, comprising:

an electrical field generator, comprising a field generating electrode configured to provide a time-varying electric field for injection of ions to be analysed, excitation of ions to be analysed or both;

first and second detection electrodes, each of which is arranged such that it will receive a respective voltage pickup due to the time-varying electric field and so as to provide a respective detection signal based on a respective image current at the detection electrode; and a differential amplifier, arranged to provide an output based on the difference between the detection signal for the first detection electrode and the detection signal for the second detection electrode;

wherein the electric field generator and the first and second detection electrodes are configured such that the amplitude of the output from the differential amplifier is within an allowed range at a transition time, the allowed range being such that the output from the differential amplifier can be used to detect image currents from ions injected to the mass analyser and wherein an initialisation time period is defined between the time at which the field generating electrode begins to provide the time-varying electric field and the transition time; and wherein the application of a time-varying voltage to the field generating electrode causes mechanical oscillations in at least one of: the field generating electrode; the first detection electrode; and the second detection electrode, and wherein the mass analyzer is configured such that the time constant of damping for the mechanical oscillations is not significantly greater than the duration of the initialisation time period.

16. The mass analyser of claim 15, wherein the electric field generator and the first and second detection electrodes are configured such that the capacitance between each field generating electrode and the first detection electrode is substantially the same as the capacitance between that field generating electrode and the second detection electrode.

17. The mass analyser of claim 15, further comprising:

vibration dampers, arranged to define the time constant of damping for the mechanical oscillations.

18. The mass analyser of claim 15, wherein at least one of: the field generating electrode; the first detection electrode; and the second detection electrode is made from a metal having a hardness, said hardness defining the time constant of damping for the mechanical oscillations.

19. A method of mass analysis, comprising:

providing a time-varying voltage to an electrical field generator comprising at least one field generating electrode, so as to provide a time-varying electric field for injection of ions to be analysed, excitation of ions to be analysed or both;

receiving at first and second detection electrodes, a respective voltage pickup due to the time-varying electric field;

providing from each of the first and second detection electrodes a respective detection signal, based on a respective image current at the detection electrode; and generating a differential amplifier output, based on the difference between the detection signal for the first detection electrode and the detection signal for the second detection electrode;

wherein the electrical field generator comprises at least one field generating electrode without a spatially symmetrical counterpart; and wherein the voltage pickup received at the first detection electrode is substantially the same as the voltage pickup received at the second detection electrode.

20. The method of claim 19, wherein the electric field generator and the first and second detection electrodes are configured such that the capacitance between each field generating electrode and the first detection electrode is substantially the same as the capacitance between that field generating electrode and the second detection electrode.

21. The method of claim 19, wherein the amplitude of the output from the differential amplifier is within an allowed range at a transition time, the allowed range being such that the output from the differential amplifier can be used to detect image currents from ions injected to the mass analyser and wherein an initialisation time period is defined between the time at which the step of providing a time-varying voltage to the field generating electrode begins and the transition time.

22. The method of claim 21, wherein during at least the initialisation time period, the voltage pickup on the first detection electrode is of sufficient magnitude such that the detection signal for the first detection electrode would saturate the differential amplifier if the detection signal for the second detection electrode were zero.

23. The method of claim 21, wherein the initialisation time period has a duration of no more than 1 ms.

24. The method of claim 21, wherein the step of providing a time-varying voltage to field generating electrode comprises generating an electric field which causes ions to oscillate at a frequency that changes with time, the rate of change of ion oscillation frequency with time being set at a relatively high value at the start of the initialisation time period and at a relatively low value at the end of the initialisation time period.

25. The method of claim 24, further comprising:

detecting ions during a detection time period, the detection time period starting at the transition time and having a duration, T, and wherein the rate of change in ion oscillation frequency integrated over T is no greater than 1/T.

26. A method of manufacturing a mass analyser, comprising:

providing an electrical field generator, comprising at least one field generating electrode configured to receive a time-varying voltage in order to provide a time-varying electric field for injection of ions to be analysed, excitation of ions to be analysed or both, the electrical field generator comprising at least one field generating electrode without a spatially symmetrical counterpart;

arranging first and second detection electrodes such that each will receive a respective voltage pickup due to the time-varying electric field and such that each provides a respective detection signal based on a respective image current at the detection electrode;

arranging a differential amplifier to provide an output based on the difference between the detection signal for the first detection electrode and the detection signal for the second detection electrode; and configuring the electric field generator and the first and second detection electrodes such that the capacitance between each field generating electrode and the first detection electrode is substantially the same as the capacitance between that field generating electrode and the second detection electrode.

27. A method of manufacturing a mass analyser, comprising:

providing an electrical field generator, comprising at least one field generating electrode configured to receive a time-varying voltage in order to provide a time-varying electric field for injection of ions to be analysed, excitation of ions to be analysed or both;

arranging first and second detection electrodes such that each will receive a respective voltage pickup due to the time-varying electric field and such that each provides a respective detection signal based on a respective image current at the detection electrode;

arranging a differential amplifier to provide an output based on the difference between the detection signal for the first detection electrode and the detection signal for the second detection electrode; and configuring the electric field generator and the first and second detection electrodes such that the amplitude of the output from the differential amplifier is within an allowed range at a transition time, the allowed range being such that the output from the differential amplifier can be used to detect image currents from ions injected to the mass analyser, an initialisation time period being defined between the time at which the field generating electrode begins to provide the time-varying electric field and the transition time;

wherein the application of a time-varying voltage to the field generating electrode causes mechanical oscillations in at least one of: the field generating electrode; the first detection electrode; and the second detection electrode; and the method further comprising adjusting the mass analyser such that the time constant of damping for the mechanical oscillations is not significantly greater than the duration of the initialisation time period.

* * * * *